United States Patent [19]
DeJean

[11] 3,922,486

[45] Nov. 25, 1975

[54] SIGNALLING SYSTEM

[75] Inventor: Jacques Henri DeJean, Ris Orangis, France

[73] Assignee: International Standard Electric Corporation, New York, N.Y.

[22] Filed: Apr. 3, 1974

[21] Appl. No.: 457,538

[30] Foreign Application Priority Data

June 26, 1973 France ............................ 73.23273

[52] U.S. Cl. ........... 178/68; 178/58 R; 178/69.5 R; 179/15 BY; 325/38 R; 325/64; 340/146.1 BE; 340/146.1 D; 340/168 S

[51] Int. Cl. ............................................ G08c 15/12

[58] Field of Search ........ 178/58 R, 58 A, 68, 69 R, 178/69.5 R; 179/2 DP, 2 B, 2 E, 15 BY; 325/5, 38 R, 41, 64; 340/146.1 BE, 146.1 D, 147 R, 168 SR

[56] References Cited

UNITED STATES PATENTS 3,626,372 12/1971 Chayt ............................ 340/168 R

*Primary Examiner*—Robert L. Griffin
*Assistant Examiner*—Marc E. Bookbinder
*Attorney, Agent, or Firm*—John T. O'Halloran; Menotti J. Lombardi, Jr.; Alfred C. Hill

[57] ABSTRACT

There is disclosed herein a signalling system between two units for a data transmission system which transmits digital data messages character by character between these two units. The signalling system includes a transmitter-receiver disposed in each of the two units having a control output for controlling the data transfer registers of the corresponding one of the two units. These transmitters-receivers are connected by two wires. The first wire permits transmission of clock pulses for synchronization and the second wire permits the transmission of signalling by means of the presence or absence of a current at predetermined bit times of the data characters.

1 Claim, 3 Drawing Figures

SIGNALLING SYSTEM

BACKGROUND OF THE INVENTION

This invention relates to a signalling system for transmission of binary digital messages and, more particularly, a signalling system concerning the character by character transmission of a message composed of characters whose binary elements or bits are transmitted serially.

The signalling system of the invention may be used, for example, in a message processing center in which several message registers or storages can be placed in communication with several computing or decision units by means of selection coupling fields. In such processing centers, it is advantageous to transmit messages serially in order to be able to use relatively simple cross points in the coupling fields. In fact, considering characters of eight bits, for example, each cross point, in the case of parallel transmission, should be able to switch eight wires plus the internal signalling wires, the number of signalling wires being a function of the number of possible signalling functions. On the other hand, in the case of a serial transmission, the number of wires to be switched is one for the transmission of bits plus a smaller number of signalling wires, because the signalling can be transmitted by the time division multiplexing method using the bit times of the serial transmission, and finally one synchroniation wire.

SUMMARY OF THE INVENTION

An object of this invention is to provide such a signalling system for character by character transmission of a message of characters, with the transmission being done serially.

The signalling system fulfills the conventional signalling functions as well as functions related specifically to the type of processing center. Among the conventional functions are the transmission of signals indicating that the transmitting unit and the receiving unit are interconnected and operating correctly, and the transmission of a release signal from one unit to the other and vice versa. Among the specific functions may be mentioned a blocking function, a cancelling function, a blocking signal acknowledgement function, etc.

If one considers, for example, the link in a processing center between a storage and an arithmetic unit through a coupling field, using the serial transmission mode, it is first necessary, before the start of a message or character transmission, to be sure that the two units are indeed connected through the coupling field and that one is ready to transmit and the other ready to receive. Concerning the release, it must be assured that one of the units is not released prematurely before the end of the transmission of the last character of the message. In addition, the arithmetic unit can, upon receipt of a character, be required to perform a certain number of operations which take time and, for this reason, does not wish to receive the rest of the characters immediately. Therefore, a blocking function must be provided. Finally, in particular for messages composed of self-correcting characters, it is sometimes necessary to cancel an entire message when one or a predetermined number of successive characters are erroneous and cannot be corrected. The cancelling function then allows the arithmetic unit to be released practically immediately, without having to receive a large number of useless characters, by sending a cancelling signal to the storage which is assumed to be equipped for this procedure.

It should be noted here that the blocking function can take place in certain cases by suspension of the transmission of synchronization signals from one unit to the other, but this function is then possible only for the unit which generates the sync signal for itself and the connected unit.

Another object of the invention is to provide a signalling system, such as described above, in which the blocking signal can be transmitted by either unit.

A feature of the present invention is the provision of a signalling system for a data transmission system transmitting digital data messages character by character comprising: a first unit including a message output register capable of storing a character of the message and having an advance input, a clock to generate a clock signal; and a first signalling transmitter-receiver coupled to the clock and the advance input of the output register, the first transmitter-receiver controlling the coupling of the clock to the advance input of the output register; a second unit including a message input register capable of storing a character of the message and having an advance input, and a second signalling transmitter-receiver coupled to the advance input of the input register; a first wire coupled between the output register and the input register to transmit the message characters serially from the output register to the input register; a second wire coupled between the first and second transmitters-receivers to transmit the clock signal therebetween for synchronization of the first and second transmitters-receivers and the output and input registers; and a third wire coupled between the first and second transmitters-receivers for signalling, each signal resulting in a suitable change of state of the third wire at a predetermined bit time of the message character being transmitted on the first wire.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
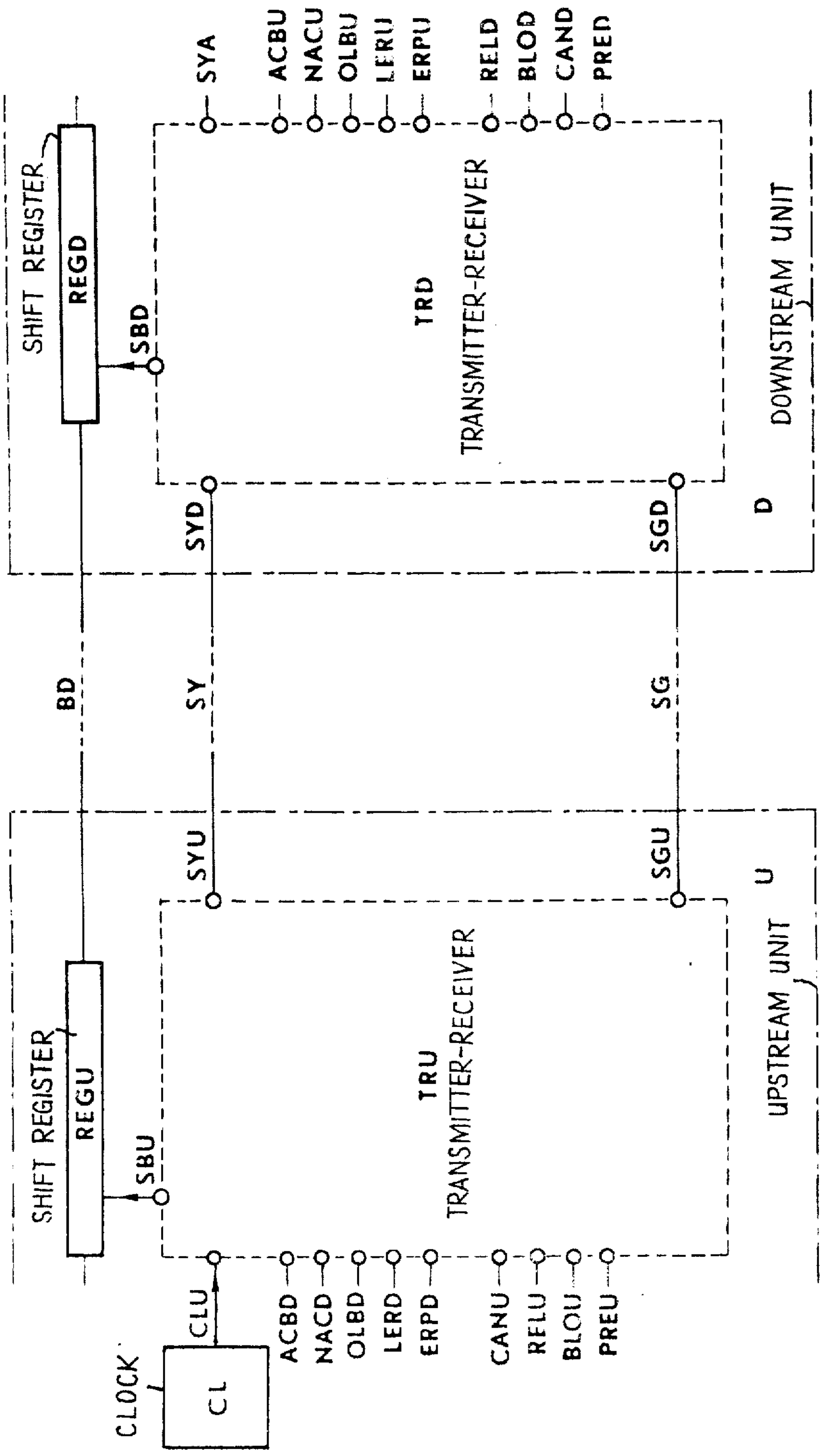
FIG. 1 is a block diagram showing two units of a processing center in which the transmission of binary data from one unit to the other is controlled by a signalling system in accordance with the principles of the present invention.

FIG. 1 shows a unit U which will also be called an upstream or first unit to indicate that it transmits binary data to a unit D which will also be called a downstream or second unit to indicate that it receives the binary data. In unit U, the binary data are stored in a shift register REGU including, for example, of 8-bit stages, each stage containing one bit of a character of binary data. The data is transmitted serially on wire BD connected between the output of register REGU and the input of register REGD in unit D. Register REGD, like REGU, is made up of 8-bit stages.

It should be noted that the choice of 8-bit characters is not the only possibility and that the system according to this invention can, with slight modifications, be used with characters of four or sixteen bits, for example.

The unit U includes a transmitter-receiver TRU, and unit D a transmitter-receiver TRD. Transmitters-receivers TRU and TRD are connected by two wires SY and SG, wire SY transmitting the bit synchronization and wire SG the signalling itself.

Transmitter-receiver TRU has four signal inputs: CANU which is activated when unit U decides on the cancellation in units U and D of the content of registers REGU and REGD, RELU which is activated when unit U decides to release unit D at the end of a transmission, BLOU which is activated when unit U decides to stop the transmission for the duration of one character, and PREU which is activated at the time unit U is ready to begin transmission of the start of a message.

Transmitter-receiver TRD includes analogous inputs: CAND, RELD, BLOD, and PRED whose functions are clearly inferred from those of the corresponding inputs of transmitter-receiver TRU.

Transmitter-receiver TRU includes five signal outputs: ACBD which delivers a signal when the input BLOU has been activated and the blocking order has been received in transmitter-receiver TRD, NACD which delivers a signal when the input CAND has been activated, LERD which delivers a signal when the input RELD has been activated, OLBD which delivers a signal when the input BLOD has been activated, and ERPD which delivers a signal when the input PRED has been activated.

The transmitter-receiver TRD includes analogous outputs: NACU, ACBU, OLBU, LERU and ERPU whose functions are clearly inferred from those of the corresponding outputs of transmitter-receiver TRU.

Transmitter-receiver TRU has still another input CLU for clock signals supplied by a clock CL whose frequency is the bit frequency, an output SBU by which the bit synchronization signals are applied to register REGU to make this register advance, an output SYU by which the clock signals are transmitted to the input SYD of transmitter-receiver TRD, and an output SGU by which the signalling is transmitted to the input SGD of transmitter-receiver TRD. Transmitter-receiver TRD includes an output SBD by which the bit synchronization signals are applied to register REGD to make it advance and, if desired, a supplementary output SYA by which the clock signals may be applied to other circuits in D, if necessary.

The operation of the system shown in FIG. 1 will now be described. It is assumed that continuity of the wires BD, SY and SG is obtained, for example, through a coupling field having three-wire crosspoints. It is assumed also, in this example, that the unit U is a storage and unit D an arithmetic circuit. Obviously these two units also include decision, storage or computing circuits other than the transmitter-receivers and storages shown in FIG. 1.

When transmitters-receivers TRU and TRD are ready, the first one to transmit and the other to receive, the upstream presence input PREU and the downstream presence input PRED are activated as well as the corresponding outputs ERPU and ERPD which initiates the start of the transmission upon closing the crosspoint connecting the units by activating the outputs SBU and SBD in synchronism to ensure the synchronous operation of registers REGU and REGD while the clock signals are transmitted by SY. In each 8-bit character, there are eight time slots and at each time slot the state of current flowing or not on wire SG indicates, theoretically, the state of one of the signal inputs or, in exceptions, the common state of both signal inputs belonging to transmitters-receivers TRU and TRD, respectively.

To the extent that the transmission character by character is to continue without interruption, only the inputs PREU and PRED are activated. If the computer circuit D recognizes in register REGD a character that it must process and if the processing is to last the time of a character or longer, the downstream blocking input BLOD is activated which blocks in transmitter-receiver TRU the transmission of the character following the one during which the BLOD input is activated. This action inhibits the outputs SBU and SBD after the end of the character in progress. In addition, as will be seen later, transmitter-receiver TRU sends back a blocking signal acknowledgement which is delivered to unit D through ACBU which permits unit D to de-activate the input BLOD or to reactivate it if the blocking is to last longer than one character. It should be noted that, during a blocking, wire SY continues to transmit the clock signals which ensures the synchronous operation of the two transmitters-receivers. Lastly, the inputs PREU and PRED remain activated indicating that if there is a stop in transmission, the units are still in communication.

At the end of the message, the unit U activates the release input RELU which, at the end of the character being transmitted, activates the outputs LERD and LERU indicating that unit D can initiate its processing phase in "isolated" mode. Besides, internal connections RAZU and RAZD are activated to ensure the reinitiation of all the bistable circuits in transmitters-receivers TRU and TRD.

If, during a calculation, unit D detects an error in a character, it can decide to cancel the whole message and, to do this, activate the downstream cancellation input CAND. Unit D of course cancels the content of register REGD and, output NACD being activated, unit U cancels the content of register REGU and then, for example, activates the upstream release input RELU. We then return to the preceding operation.

As a rule, it is the upstream unit which makes the release decision because it generally detects the end of the message. However, if the downstream unit is, for example, a limited capacity storage, it can be designed to decide the release when it is full. It is for this reason, in order to provide a multiple usage circuit, that a release input RELD is also indicated in the downstream transmitter-receiver TRD.

Figure 2:
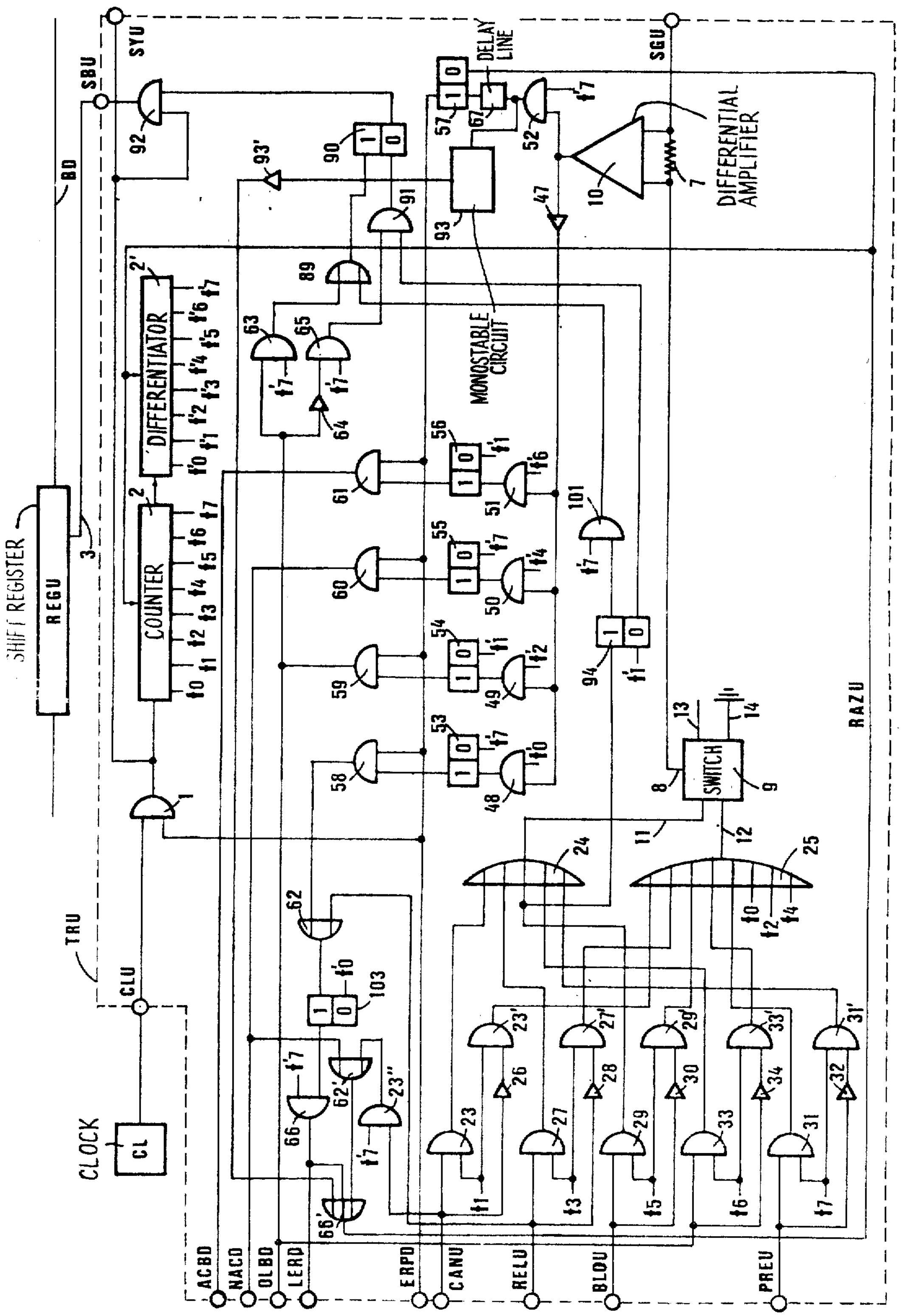
FIG. 2 is a logic diagram of the transmitter-receiver TRU of the signalling system of FIG. 1 which is located in the unit supplying the binary data, in accordance with the principles of the present invention.

FIG. 2 illustrating the logic diagram of transmitter-receiver TRU of FIG. 1 will now be described. The output of the clock CL is connected through the input CLU to the first input of an AND gate 1 having two inputs. The output of gate 1 is connected, on the one hand, to wire SY through the output SYU and, on the other hand, to the signal input of a counter 2 which delivers across eight outputs the pulses t0 to t7 which will be used to control the AND gates 23, 27, 29, 33, 31 corresponding to control inputs CANU, RELU, BLOU and PREU. The pulses supplied by the counter 2 are differentiated in a differentiator circuit 2' so as to obtain the fine times *t'0* to *t'7* which the transmitter-receiver TRU needs. These fine times also undergo in circuit 2′ a shift (lower than a bit time slot) so that the clock phase shifts between transmitters-receivers TRU and TRD, particularly due to transmission, have no effect on the state of the signalling wire SG at the bit time slots when the state of wire SG is sampled. In addition the clock signals CL are transmitted by an AND gate 92 to register REGU for controlling the shifting of the information bits therein.

Figure 3:
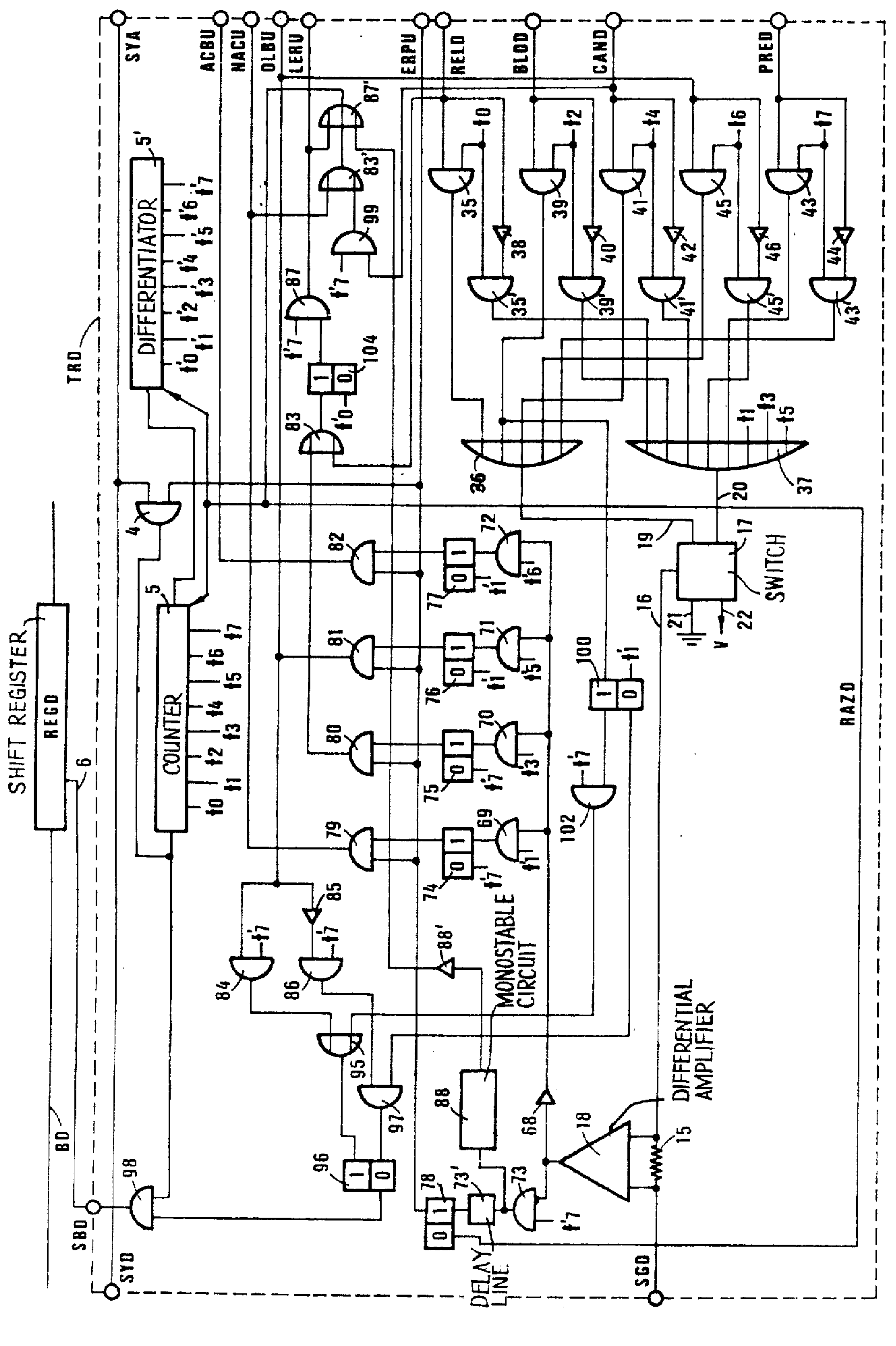
FIG. 3 is a logic diagram of the transmitter-receiver TRD of the signalling system of FIG. 1 which is located in the unit receiving the binary data in accordance with the principles of the present invention.

In transmitter-receiver TRD of FIG. 3, wire SY is connected through input SYD to the first input of an AND gate 4 having two inputs. The output of gate 4 is connected to the signal input of a counter 5 which delivers across eight outputs the pulses *t0* to *t7* synchronous with those of transmitter-receiver TRU and which serve to control the AND gates 35, 39, 41, 45 and 43 corresponding to inputs RELD, BLOD, CAND and PRED. As above, these pulses are processed in a differentiator circuit 5′, which supplies the fine times which the transmitter-receiver TRD needs. In addition, the clock signals from input SYD are transmitted through AND gates 4 and 98 to the advance input of shift register REGD.

In transmitter-receiver TRU, the signalling wire SG is connected through terminal SGU and a resistor 7 to the output 8 of a switch 9. The two terminals of resistor 7 are connected across the two input leads of a differential amplifier 10. Switch 9 is a circuit having two control inputs 11 and 12, and two signal inputs 13 and 14. Input 13 is open and input 14 is grounded. The activated control input 11 connects nput 13 to output 8 while the control input 12 when activated connects input 14, that is to say ground, to output 8.

In transmitter-receiver TRD, the signalling wire SG is connected through terminal SGC and a resistor 15 to the output 16 of a switch 17. The two terminals of resistor 15 are respectively connected to the two inputs of a differential amplifier 18. switch 17 is similar to switch 9 and has two control inputs 19 and 20 and two signal inputs 21 and 22. The activated control input 19 connects input 21, that is to say ground, to output 16 while the control input 20 connects input 22, that is to say a potential V, to output 16.

Amplifiers 10 and 18 each deliver an output signal when the resistors 7 and 15, connected in series with the wire SG, have current flowing through them, i.e. when the control inputs 12 and 20 are simultaneously activated since, in this case, output 8 is connected to ground through input 14 and output 16 is connected to the potential V through input 22. In the three other possible cases, no current flows in resistors 7 and 15 and amplifiers 10 and 18 deliver no output signal. In fact, if control inputs 11 and 19 or control input 20 are simultaneously activated, there is no current since input 13 is open and, if control inputs 12 and 19 are simultaneously activated, there is also no current because the two terminals 14 and 21 are at the same ground potential.

In transmitter-receiver TRU, the input CANU is connected to the first input of an AND gate 23 whose second input is connected to the output *t1* of the counter 2 and whose output is connected directly to an input of an OR gate 24 having five inputs. In addition, the input CANU is connected through an inverter 26 to an AND gate 23′ controlled by output t1 whose output is connected to one input of an OR gate 25 having eight inputs. Input CANU is also connected to the first input of the AND gate 23″ whose second input is controlled by output *t′7* of differentiator 2′ and whose output is connected to the first input of an OR gate 62′, the second input of which is connected to output NACD. The output of gate 62′ is connected to an OR gate 66′ having three inputs whose output RAZU controls the reset to zero of counter 2, differentiator 2′ and flip flop 57. The second input of OR gate 66′ is connected to output LERD whereas the third input of this gate is connected to the output of the differential amplifier 10 through an AND gate 52, a monostable circuit 93 and an inverter 93′. The pulse duration of circuit 93 is equal to the duration of a character. Input RELU is connected to the first input of an AND gate 27 whose second input is connected to the output *t3* of counter 2 and whose output is connected directly to one input of the OR gate 24. In addition, input RELU is connected through an inverter 28 to an AND gate 27′ controlled by output *t3* of counter 2 whose output is connected to one input of the OR gate 25. The input BLOU is connected to the first input of an AND gate 29 whose second input is connected to the output t5 of counter 2 and whose output is connected directly to one input of the OR gate 24. In addition, input BLOU is connected through an inverter 30 to an AND gate 29′ controlled by output *t5* of counter 2 whose output is connected to one input of the OR gate 25. The input PREU is connected to the first input of an AND gate 31 whose second input is connected to the output t7 of counter 2 and whose output is connected directly to one input of the OR gate 25. In addition, the input PREU is connected through an inverter 32 to an AND gate 31′ controlled by output t7 of counter 2 whose output is connected to one input of the OR gate 24. The fourth input of the OR gate 24 is connected directly to the output of an AND gate 33 whose second input is connected to the output t6 of counter 2, the first input of gate 33 also being connected to one input of the OR gate 25 through an inverter 34 and an AND gate 33′ controlled by output *t6* of counter 2. The last three inputs of the OR gate 25 are connected to outputs *t0*, *t2* and *t4*, respectively, of counter 2.

In transmitter-receiver TRD, the input RELD is connected to the first input of an AND gate 35 whose second input is connected to the output t0 of counter 5 and whose output is connected to one input of an OR gate 36 having five inputs. In addition, input RELD is connected through an inverter 38 to an AND gate 35′ controlled by output t0 of counter 5 whose output is connected to one input of an OR gate 37 having eight inputs. The input BLOD is connected to the first input of an AND gate 39 whose second input is connected to the output t2 of counter 5 and whose output is connected to one input of the OR gate 36. In addition, input BLOD is connected through an inverter 40 to an AND gate 39′ controlled by output t2 of counter 5 whose output is connected to one input of the OR gate 37. The input CAND is connected to the first input of an AND gate 41 whose second input is connected to the output *t4* of counter 5 and whose output is connected directly to one input or OR gate 36. In addition, input CAND is connected through an inverter 42 to an AND gate 41′ controlled by output t4 of counter 5 whose output is connected to one input of OR gate 37. The input CAND is also connected to an AND gate 99 controlled by output *t′7* of differentiator 5′ whose output is connected to the first input of an OR gate 83′, the second input of gate 83′ being connected to output NACU. The output of OR gate 83′ is connected to an OR gate 87' having three inputs whose output RAZD controls the reset to zero of counter 5, differentiator 5' and flip flop 78. The second input of gate 87' is connected to output LERU whereas the third input of gate 87' is connected to the differential amplifier 18 through an AND gate 73, a monostable circuit 88 and an inverter 88'. The pulse duration of circuit 88 is equal to the duration of a character. The input PRED is connected to the first input of an AND gate 43 whose second input is connected to the output *t*7 of counter 5 and whose output is connected directly to one input of the OR gate 37. In addition, the input PRED is connected through an inverter 44 to an AND gate 43' controlled by output *t*7 of counter 5 whose output is connected to one input of the OR gate 36. The fourth input of the Or gate 36 is connected to the output of an AND gate 45 whose second input is connected to the output of counter 5, the first input of gate 45 being connected to one input of the OR gate 37 through an inverter 46 and an AND gate 45' controlled output by t6 of counter 5. The last three inputs of OR gate 37 are connected to outputs t1, t3 and t5, respectively, of counter 5.

In transmitter TRU, the output of differential amplifier 10 is connected, through an inverter 47, to the first inputs of AND gates 48, 49, 50 and 51 respectively. The second input of gate 48 is connected to the output *t'*0 of differentiator 2', that of gate 49 to the output *t'*2, that of gate 50 to the output *t'*4 and that of gate 51 to the output *t'*6. The output of amplifier 10 is also connected directly to the first input of an AND gate 52 whose second input is connected to output *t'*7 of differentiator 2'. The respective outputs of AND gates 48 to 51 are connected to the binary 1 inputs of the bistable flip flops 53 to 56. The binary 0 inputs of flip flops 53 and 55 are connected to output *t'*7 of differentiator 2' and the 0 inputs of flip flops 54 and 56 are connected to output *t'*1 of differentiator 2'. The output of gate 52 is connected to the input of a delay line 67 whose output is connected to the 1 input of flip flop 57 whose 0 input is connected to output RAZU of gate 66'. The 1 outputs of flip flops 53 to 56 are connected to the first inputs of the AND gates 58 to 61, respectively, whose second inputs are connected to the 1 output of flip flop 57. The output of AND gate 58 is connected to one input of an OR gate 62 having two inputs whose output is connected to 1 input of a flip flop 103 whose 1 output is connected to the first input of an AND gate 66 whose output is connected to the output LERD. The output of gate 59 is connected first to the output OLBD, second to the first input of the AND gate 33, third to the first input of an AND gate 63, and finally, through an inverter 64 to the first input of an AND gate 65. The output of gate 63 is connected to the first input of an OR gate 89 whose second input is connected to the output of an AND gate 101. The output of AND gate 65 is connected to the first input of AND gate 91 whose second input is connected to the 0 output of flip flop 94.

The output of OR gate 89 is connected to the 1 input of flip flop 90, the output of gate 91 being connected to the 0 input of this flip flop. The 0 output of flip flop 90 is connected to the first input of an AND gate 92 whose second input is connected to the output of gate 1. The output of gate 92 is connected to output SBU.

In addition, the output of AND gate 29 is also connected to the 1 input of flip flop 94, the 0 input of this flip flop being connected to output *t'*1 of differentiator 2'. The 1 output of flip flop 94 is connected to the first input of AND gate 101, the second input of gate 101 being connected to output *t'*7 of differentiator 2'. The second inputs of gates 63 and 65 are connected to the outputs *t'*7 of differentiator 2'. The second input of OR gate 62 is connected to the first input of AND gate 27. The 1 output of flip-flop 57 is also connected to the output ERPD, and to the second input of gate 1. The output of gate 60 is connected to the output NACD, and the output of gate 61 is connected to the output ACBD. The 0 input flip flop 103 is connected to output *t'*0 of differentiator 2' while the second input of gate 66 is connected to output *t'*7 of differentiator 2'.

In transmitter-receiver TRD, the output of differential amplifier 18 is connected through an inverter 68 to the first inputs of AND gate 69 to 72, respectively. The second input of gate 69 is connected to output *t'*1 of differentiator 5', that of gate 70 to output *t'*3, that of gate 71 to output *t'*5 and that of gate 72 to output *t'*6. The output of amplifier 18 is also connected directly to the first input of an AND gate 73 whose second input is connected to output *t'*7 of differentiator 5'. The output of gate 73 is connected through a delay line 73' to the 1 input of flip flop 78. The outputs of AND gates 69 to 72 are connected to the 1 inputs of the bistable flip flops 74 to 77, respectively. The 0 outputs of flip flops 74 and 75 are connected to the output *t'*7 of differentiator 5'. The 0 input of flip flops 76 and 77 are connected to the output *t'*1 of differentiator 5'. The 0 input of flip flop 78 is connected to the output RAZD of gate 87'. The outputs of flip flops 74 to 77 are connected respectively to the first inputs of the AND gates 79 to 82, whose second inputs are connected in parallel to the 1 output of flip flop 78. The output of gate 79 is connected to the output of gate 80 is connected to the first input of an OR gate 83 having two inputs whose output is connected to the 1 input of flip flop 104 whose 1 output is connected to the first input of an AND gate 87 whose output is connected to the output LERU. The output of gate 81 is connected first to the output OLBU, second to the first input of gate 45, third to the first input of an AND gate 84, and finally through an inverter 85 to the first input of the AND gate 86. The output of AND gate 84 is connected to the first input of an OR gate 95 whose second input is connected to the output of an AND gate 102. The output of AND gate 86 is connected to the first input of AND gate 97 whose second input is connected to 0 output of flip flop 100.

The output of OR gate 95 is connected to the 1 input of flip flop 96, the output of gate 97 being connected to the 0 input of this flip flop. The 0 output of flip flop 96 is connected to the first input of AND gate 98 whose second input is connected to the output of gate 4. The output of gate 98 is connected to output SBD.

In addition, the output of gate 39 is also connected to the 1 input of flip flop 100, the 0 input of flip flop 100 being connected to output t'1 of differentiator 5'. The 1 output of flip flop 100 is connected to the first input of AND gate 102, the second input of this gate being connected to output *t'*7 of differentiator 5'. The second inputs of gates 84 and 86 are connected to the output *t'*7 of differentiator 5'. The second input of OR gate 83 is connected to the first input of gate 35. The 1 output of flip flop 78 is also connected to the output ERPU, and to the second input of gate 4. The 0 input of flip flop 104 is connected to output t'0 of differentiator 5' while the second input of gate 87 is connected to the output t'7 of differentiator 5'.

It is quite clear, even in the case in which unit U continues to be the upstream unit, that is to say that it transmits data to the downstream unit D, that the clock CL would very well be connected directly to transmitter-receiver TRD without appreciably modifying the diagram or the operation, as will be seen below.

It will be noted that the wire SY is extended across transmitter-receiver TRD to a supplementary output SYA which permits the possible synchronization of another pair of transmitter-receivers, if, for example, the unit D is connected to another unit farther downstream and the transmissions from unit U to unit D and from unit D to unit D' are to be done synchronously.

The signals that two transmitters-receivers, such as transmitters-receivers TRU and TRD can exchange are shown in the table hereunder.

time delay due to delay line 73' slightly lower than that of transmitter-receiver TRU. Outputs ERPD and ERPU are activated indicating to the other logic circuits of units U and D that these units are still connected. The 1 output signals of flip flops 57 and 78 keep gates 1 and 4 open, respectively, in order to allow the clock signals to pass through to counters 2 and 5, and differentiators 2' and 5'. The clock signals are also transmitted to shift registers REGU and REGD through gates 92 and 98. Finally, at time *t'*7, the output signals of gates 52 and 73 retrigger, respectively, the monostable circuits 93 and 88. The absence of these signals would cause, due to non-retriggering of these circuits, the reset to zero of transmitters-receivers TRU and TRD through inverters 93' and 88' and OR gates 66' and 87'.

| Time positions within a character | Signals transmitted by upstream unit to downstream unit (transmitter-receiver TRU) | 1 | 2 | Signals transmitted by downstream unit to upstream unit (transmitter-receiver TRD) | 1 | 2 |
|---|---|---|---|---|---|---|
| 0 | | LERD | M | Downstream release | RELD | M |
| 1 | Upstream cancellation | CANU | O | | NACU | P |
| 2 | | OLBD | M | Downstream blocking | BLOD | M |
| 3 | Upstream release | RELU | O | | LERU | P |
| 4 | | NACD | M | Downstream cancellation | CAND | M |
| 5 | Upstream blocking | BLOU | O | | OLBU | P |
| 6 | Downstream blocking acknowledgement | ACBD | O | Upstream blocking acknowledgement | ACBU | M |
| 7 | Upstream presence | PREU | M | Downstream presence | PRED | P |

In the normal state of character transmission between units U and D, a signal is applied to terminal PREU of transmitter-receiver TRU and a signal is applied to terminal PRED of transmitter-receiver TRD. On the other hand, no signal is applied to terminals CANU, RELU, BLOU, CAND, RELD, BLOD. Consequently, for all times *t*0 to *t*7, a signal is applied to input 12 of switch 9 through OR gate 25 and a signal is applied to input 20 of switch 17 through OR gate 37. Therefore, in transmitter-receiver TRU, ground is applied through input 14 to the wire SG and, in transmitter-receiver TRD, a potential V is applied through input 22. For all bit times *t*0 to *t*7, one has the state shown for position 7 in the above table, i.e. a ground M in transmitter-receiver TRU and a bias P in transmitter-receiver TRD. From *t*0 to *t*7, current flows in the wire SG and is detected by the differential amplifiers 10 and 18. However, from *t*0 to *t*7, inverters 47 and 68 prevent gates 48 to 51 and gates 69 to 72, respectively, from operating by inhibiting their first inputs. Flip flops 53 to 56, on the one hand, and flip flops 74 to 77, on the other hand, remain in their rest state 0 and gates 58 to 61, on the one hand, and gates 79 to 82, on the other hand, remain closed. At time *t'*7, the output signal from amplifier 10 goes through gate 52 and assures that flip flop 57 is in its work state 1 with a certain delay provided by delay line 67 so as to be sure that transmitter-receiver TRD is ready to synchronize. Likewise, at time *t'*7, the output signal from amplifier 18 goes through gate 73 and assures the state 1 of flip flop 78 with a time delay due to delay line 73'...

Let us assume, as has already been said, that the computing circuit D recognizes a character in REGD that it must process and whose processing is to last a certain time. The downstream blocking input BLOD is activated and at time *t*2 of the character being transmitted, gate 39 is open. A signal is applied to OR gate 36 while inverter 40 suppresses the signal at the input of OR gate 37. The result is that terminal 21 grounds output 16 of switch 17. In addition, in transmitter-receiver TRU, only the signal PREU is applied, therefore, switch 9 continues to apply the ground of terminal 13 to output 8. Thus, at time t2, no current is flowing in wire SG whose two ends are at the same ground potential, and amplifiers 10 and 18 deliver no signal. This has no effect in transmitter-receiver TRD, but in transmitter-receiver TRU inverter 47 applies a signal which opens gate 49 at time *t'*2 causing flip flop 54 to change to state 1. AND gate 59 whose second input is activated by the 1 output 1 of flip flop 57 applies a signal to the output OLBD, to gate 33, to gate 63 and to inverter 64. In addition, in transmitter-receiver TRD the output of gate 39 applies a signal to the 1 input of flip flop 100 which changes to state 1 and applied a signal to the input of gate 102.

At times t3 to t5, input 20 of switch 17 again commands the application of potential V to output 16. Nothing more happens until time *t*6. At time *t*6 in transmitter-receiver TRU, gate 33 opens and commands the application of a signal to input 11 of switch 9, thus connecting output 8 to the open circuit 13. Current no longer flows in resistors 7 and 15 and amplifiers 18 and 10 deliver no signal. Inverters 47 and 68 apply a signal which opens gates 51 and 72 at time $t'6$ and causes flip flops 56 and 77 to change to state 1. The AND gates 61 and 82 whose second inputs are activated by 1 outputs of flip flops 57 and 78 then apply a signal to outputs ACBD and ACBU, respectively. At time $t'7$, gate 63 is open and a signal is applied, through OR gate 89, to flip flop 90 which changes to state 1, which inhibits the 0 output of flip flop 90 and closes gate 92. Therefore, the clock signals corresponding to the following $t0$ to $t7$ times will not be applied as bit synchronization to register REGU. In transmitter-receiver TRD at time $t'7$, gate 102 is open and applies a signal to flip flop 96 through OR gate 95. Flip flop 96 changes to state 1 and its 0 output is inhibited which closes gate 98 and the clock signals corresponding to the following times $t0$ to $t7$ will not be applied as bit synchronization to register REGD. Thus, it is clearly seen that the character which follows the moment of the application of a signal to input BLOD will not be transmitted immediately because the advance of register REGU and REGD is inhibited. On the other hand, it should be noted that the transmission of clock pulses on the wire SY and to counters 2 and 5 is not stopped and synchronism is maintained between the two transmitters-receivers. Normally, the output signal from the terminal ACBU causes the suppression in unit D of the signal applied to terminal BLOD, that is to say will allow transmission to start again unless the signal applied to BLOD is immediately re-established, which will not be considered hereafter.

During times $t0$ to $t7$ in which no character is transmitted, at time $t'1$ flip flops 54 and 100 are reset to state 0, on the one hand, and flip flops 56 and 77 are reset to state 0, on the other hand. The output signals from ACBU and ACBD disappear. In addition, in transmitter-receiver TRU inverter 64 applies a signal to gate 65 and, at the following time $t'7$, gate 65 resets flip flop 90 to the state 0 by means of AND gate 91 which again opens the gate 92. In transmitter-receiver TRD, the 0 output of flip flop 100 applies a signal to gate 97 which will be opened by the output from gate 86 at the following time $t'7$, which will reset flip flop 96 to the state 0 and again open gate 98. It will be noted that gates 92 and 98 are reopened in synchronism immediately after the time $t7$ corresponding to a character non-transmitted and that the two registers REGU and REGD are simultaneously put in the advance state.

In the case of transmission blocking decided by the transmitter-receiver TRU, operation will be practically identical, the main difference being that the blocking signal is transmitted at time $t5$, as indicated in the above table, of the character preceding the one which is not to be transmitted.

It will now be assumed that the last character of the message has been transmitted and that the transmitter-receiver TRU is to transmit the release signal to transmitter-receiver TRD, which is normal because theoretically it is the upstream circuit which knows when the last character is to be transmitted. At the start of this last character, a signal is applied to the terminal RELU and, at the time $t3$ of this character, AND gate 27 applies a signal to OR gate 24 while inverter 28 suppresses the signal at the input to OR gate 25. Amplifiers 10 and 18 deliver no signal at time $t3$. Consequently in transmitter-receiver TRD, gate 70 is opened at time $t'3$ and flip flop 75 changes to state 1. Gate 80 then transmits a signal to flip flop 104 through gate 83. The 1 output of flip flop 104 applies a signal to gate 87 and, at the following time $t'7$, gate 87 activates the output LERU. In addition, in transmitter-receiver TRU the input RELU applies a signal to OR gate 62 which makes flip flop 103 change to state 1. At the following time $t'7$, a signal is applied to terminal LERD through AND gate 66. The output signals from terminals LERU and LERD permit the release of the units in presence. Lastly, signals are applied to inputs RAZU and RAZD which reset flip flops 57 and 78 to zero which interrupts the transmission of clock pulses through gates 1 and 4. Finally, the release is achieved by the breaking of the link of the three wires SY, SG and BD in the direction of the coupling in question. Counter 2, differentiator 2', counter 5 and differentiator 5' will be reinitiated at time $t'7$, through the signals transmitted by gates 66' and 87' and coming from outputs LERD and LERU.

It will now be assumed that unit D has observed an error in a character of the transmitted message and that it wishes to release the upstream unit U without awaiting the end of the transmission of the message. It then sends a downstream cancellation message by applying a signal to the terminal CAND, which is transmitted at the following time t4 to OR gate 36 while no signal and that in transmitter-receiver TRU AND gate 50 is open at time $t'4$, flip flop 55 changes to state 1 and gate 60 is opened which applies a signal to the output NACD. In both units U and D, practically the same operations are executed as in the case of release with the terminals LERU and LERD excited, plus the messages cancelling operations. The transmitters-receivers TRU and TRD are reset to zero by the connections RAZU and RAZD.

While I have described above the principles of my invention in connection with specific apparatus it is to be clearly understood that this description is made only by way of example and not as a limitation of the scope of my invention as set forth in the objects thereof and in the accompanying claims.

I claim:

1. A signalling system for a data transmission system transmitting digital data messages character by character comprising:
  - a first unit including
    - a message output register capable of storing a character of said message and having an advance input,
    - a clock to generate a clock signal; and
    - a first signalling transmitter-receiver coupled to said clock and said advance input of said output register, said first transmitter-receiver controlling the coupling of said clock to said advance input of said output register;
  - a second unit including
    - a message input register capable of storing a character of said message and having an advance input, and
    - a second signalling transmitter-receiver coupled to said advance input of said input register;
  - a first wire coupled between said output register and said input register to transmit said message characters serially from said output register to said input register;
  - a second wire coupled to said clock and between said first and second transmitters-receivers to transmit said clock signal therebetween for synchronization of said first and second transmitters-receivers and said output and input registers; and a third wire coupled between said first and second transmitters-receivers for signalling by on-off type signals, each of said signalling signals having a suitable change of state on said third wire at predetermined bit times of said message character being transmitted on said first wire;

said states on said third wire being defined by the presence or absence of a current on said third wire; and each of said first and second transmitters-receivers including switching means coupled to the associated end of said third wire to apply to said third wire during each of said predetermined bit times a suitable potential for signalling during a transmitting mode of operation, control means coupled to said switching means to control said switching means as a function of predetermined signals to be transmitted or received at each of said predetermined bit times, detection means coupled to said third wire for detecting which of said predetermined signals is present on said third wire, and means coupled to said detection means, said means being controlled by said detection means for transmitting said clock signal to said advance input of an associated one of said output and input registers.

* * * * *